United States Patent Office 3,352,913
Patented Nov. 14, 1967

3,352,913
3 - AMINOMETHYL - 3,5,5 - TRIALKY - 1-CYCLOHEXYLAMINE AND CYCLOHEX-ANOL COMPOUNDS
Karl Schmitt, Herne, Westphalia, Josef Disteldorf, Wanne-Eickel, and Werner Hübel, Herne, Westphalia, Germany, assignors, by mesne assignments, to Scholven-Chemie Aktiengesellschaft, Gelsenkirchen-Buer, Germany
No Drawing. Filed July 15, 1964, Ser. No. 382,922
Claims priority, application Germany, Oct. 18, 1961, H 43,916
3 Claims. (Cl. 260—563)

This application is a continuation-in-part of application Ser. No. 229,206, filed Oct. 8, 1962, now abandoned.

It has been found that new compounds of the general formula:

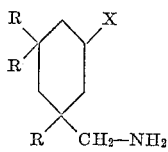

can be produced from 3-cyan-3,5,5-trialkylcyclohexanone by hydrogenation in the presence of ammonia, R representing equal or different alkyl groups, especially methyl groups, or other lower alkyl groups, e.g., alkyl groups containing about 1–4 carbon atoms, and the functional group X being an amino or hydroxyl residue. By controlling the conditions it is possible to produce one or the other reaction product (diamine or amino alcohol) in a substantially selective manner, particularly in very high yields. The fact that the reaction can be performed so smoothly is probably to be attributed primarily to the stability of the basic molecule, substantially on account of the ring system. The composition of the reaction product is due, in addition to other factors, particularly to the content of ammonia in the starting mixture, in that, as the proportion of ammonia decreases, the reaction runs in favor of the amino alcohol, whereas when it increases, the production of the diamine is favored.

Both products possess a number of outstanding properties, especially for the manufacture of high polymers such as polyamides and polyurethanes which differ very substantially and advantageously from the plastics known hitherto. Especially in case of the polyamides the products obtained show an amorphous character and not the crystallinity of the conventional polyamides such as "nylon 6" or "nylon 66." Therefore polyamides derived from the products obtained according to the invention have several new applications.

The products can be used as solid resins for production of all manner of shaped articles as are commonly produced in plastics, for example, containers, ornaments, toys. The diamino compounds are well suited for such use as are also the mono-amino compounds, and of course the latter are also useful as intermediates for production of the diamino compounds. The novel compounds are also useful as film forming components in lacquer compositions. Further, the novel compounds can be used as hardening agents for epoxy resins. Such resins can be used as cast resins adhesives and resin cements, also for coating of metals.

Particularly important is the high degree of the purity of the basic monomers which can be achieved without difficulty on account of the favorable reaction conditions and also particularly on account of the favorable separation that is achieved when vacuum-distilling the crude product.

The hydrogenation can be performed batch-wise as well as continuously. When using the catalyst to be described below, the optimum temperature for the production of either substance lies between approximately 50 and 150° C., but preferably between about 70 and 130° C. Whereas the transformation generally proceeds more rapidly at high pressure, it is best to see to it that partial pressure of the hydrogen does not fall below about 50 atmospheres. Additions of about 1 mol of $NH_3$ to from 3 to 10 mols of ketonitrile seem to favor the production of the amino alcohol, and the production of the diamine is favored by a proportion of 10 to 30 mols of $NH_3$ per mol of ketonitrile. Of course, the proportions may be greater or lesser, depending on the type of final product desired.

Any of the catalysts that can be used for hydrogenation reactions can be used in this process, especially those containing iron, cobalt, nickel, palladium and platinum and other Group VIII elements, such as ruthenium, rhodium, osmium, iridium, on supports such as diatomaceous earth, bentonite, montmorillonite, γ-alumina, kieselguhr, activated coal etc., with additives such as copper, chromium, thorium, etc. as desired. In particular, a catalyst of cobalt on kieselguhr, as used in the Fischer-Tropsch process has proven to be outstandingly effective, the metallic component amounting preferably to between 10 and 40 wt. percent of the total amount of catalyst.

A very active catalyst for example can be produced in the following manner: diatomaceous earth corresponding to that type which can be obtained under the name "Celite" is boiled with diluted aqueous hydrochloric acid and then dried. By this treatment a large surface area of the catalyst carrier is obtained and also an elimination of disturbing contaminants. The material is pulverized and then digested with an aqueous solution of cobalt nitrate with 2% B.W. thorium nitrate( calculated on cobalt nitrate charged) until the catalyst carrier has taken up 30% B.W. of cobalt. The material is then dried and heated to 450° C. After pelletizing a very active catalyst is obtained.

The 3-cyan-3,5,5-trialkylcyclohexanone that is used as a starting product is obtained from isophorone and a starting product is obtained from isophorone and hydrocyanic acid. This process can be performed in different ways. For example, it is possible to prepare isophorone together with sodium cyanide, methanol and water and then drip glacial acetic acid into this mixture, thus liberating hydrocyanic acid. The desired nitrile is then developed. It is also possible to operate at elevated temperatures between 125 and 275° C., the ketone being first prepared with alkali, and hydrocyanic acid being added drop by drop. Particularly advantageous is a procedure in which isophorone and hydrocyanic acid are passed over an alkaline catalyst deposited on solid supports (e.g., NaOH on clay shards), the hydrocyanic acid being used in quantities not exceeding about 10% by weight, of the entire starting mixture. It is not necessary to use solvent in this procedure. The temperature range lies approximately between 50 and 350° C.

The method shown by the present invention is of fundamental importance. Indeed, it has been known that ketonitriles can be hydrogenated, but in the particular case of the γ-ketonitriles they cannot be hydrogenated because they have a much greater tendency than the other ketonitriles to evolve hydrogen cyanide. Under the special conditions of the process of the invention, however, such phenomena can be avoided.

The process can be performed expediently in the presence of organic solvents, particularly the alcohols, such as methyl alcohol, ethyl alcohol, etc., and ether, but also hydrocarbons in general such as cyclohexane or the like.

Example 1

In a 2-liter autoclave, 330 g. (2 mols) of 3-cyan-3,5,5-trimethylcyclohexanone (M.P. 70° C.), 300 cc. of methanol, 300 cc. of liquid ammonia and 30 g. of a previously reduced, pulverized cobalt catalyst (33% Co on kieselgur) were placed. Hydrogen was compressed in the autoclave to 150 atmospheres overpressure, and then the autoclave was heated to 120° C. The hydrogen absorption was complete after 2 hours. After cooling, the reaction mixture was filtered off catalyst, the methanol and small quantities of water were evaporated away, and the residue was vacuum-distilled. The principal fractions were:

| 1 | B.P.$_{18}$=78–79° C | 2.4 Wt. Percent $n_D^{20}$=1.4742 (imine). |
|---|---|---|
| 2 | B.P.$_{2.5}$=113–113.7° C | 81.4 Wt. Percent $n_D^{20}$=1.4888 (diamine). |
| 3 | B.P.$_{1.6}$=135–136° C | 9.4 Wt. Percent $n_D^{20}$=1.4933 (aminoalcohol). |
|   | Distillation residue | 4.7 Wt. Percent. |

Example 2

In a 2-liter autoclave, 330 g. (2 mols) of 3-cyan-3,5,5-trimethylcyclohexanone were hydrogenated in the presence of 8.5 g. ammonia and 35 g. of the catalyst described in Example 1, at 110° C. and 150 atmospheres overpressure. Fractional distillation produced:

|  | Wt. percent |
|---|---|
| Diamine | 6.2 |
| Amino alcohol | 83.0 |

Example 3

Through a half-liter V$_2$A shaft furnace filled with 450 cc. of cobalt catalyst (33% Co on kieselgur) compressed into tablets and pre-reduced at 400° C. of a methanolic solution of 3-cyan-5,5-trimethylcyclohexanone (110 g. of the ketonitrile to 100 ml. methanol) and 25 cc. liquid ammonia, per hour, were pumped at 125° C. and 120 atmospheres overpressure. Simultaneously, 200 liters of hydrogen per hour were passed through the furnace. The furnace effluent contained 79.5 wt. percent diamine and 10.3 wt. percent amino alcohol.

Example 4

The procedure of Example 3 was followed, except 25 cc. per hour of the ketonitrile instead of 50 cc. per hour were used. The furnace effluent contained 72.8 wt. percent diamine and 14.0 wt. percent amino alcohol.

Example 5

In a 2-liter autoclave 660 g. (4 mol) 3-cyano-3,5,5-trimethyl-cyclohexanone is hydrogenated, as described in Example 1, in the presence of 600 ccm. liquid ammonia and 50 g. of a reduced Ni-catalyst (15% Ni on silica gel) at 120° C. and 140 atmospheres excess pressure. The fractionated distillation of the reaction-product shows after the expelling of the ammonia:

|  | Percent |
|---|---|
| Trimethyl-cyclohexyl-amine | 6 |
| Imine | 7 |
| Diamine | 80 |
| Amino-alcohol | 3 |
| Distillation-residue | 4 |

Example 6

155 g. 3-(aminomethyl)-3,5,5-trimethyl-1-cyclo-hexylamine, which is a diamine of the invention, are heated with 145 g. adipic acid in a glass-flask to 150°. Under slow stirring of the melt, the water formed is removed from the flask through slow increase of the vacuum. When the melt becomes viscous, the temperature is slowly raised to 200° and the vacuum to 0.01 mm. Hg. After about 30 hours a very viscous melt is formed, which upon cooling solidifies into a clear, glassy, very hard, solid product, which has an $\eta$ red-value of about 1 (measured in 0.1%-solution in formic acid). The resin can be cast while in melt condition to provide, on cooling, a shaped article for any desired use, for example, as a container, bracket, or paper weight.

Example 7

The dihydrochloride formed of hydrochloric acid and 3-(aminomethyl)-3,5,5 - trimethyl-1-cyclohexylamine, is converted at 150° C. in decalin with excess phosgene, from which is obtained in over 90%-yield the 3-isocyanato-methyl-3,5,5 - trimethyl-cyclohexyl-isocyanate (boiling point$_{14}$=162–163° C.; $n_D^{25}$=1.4820).

222.3 g. (1.0 mol) of this diisocyanate are heated within one hour to 200° C. in a vessel provided with a stirrer, dripping funnel and thermometer. During this time are added drop by drop under vigorous stirring, 160.3 g. (1.0 mol) of an isomer-mixture of 2,2,4-(2,4,4-) trimethylhexandiol. After ending of the drop by drop addition one continues to stir for another hour at 200° C. The highly viscous melt obtained furnishes after the cooling a colorless, fully transparent polyurethane. It solidifies during cooling and like the resin of Example 6, can be used to provide shaped articles.

Example 8

73 g. (0.5 mol) adipic acid are heated, together with 87.6 g. 3-(aminomethyl)-3,5,5-trimethylcyclohexanol and 1 g. anhydrous zinc chloride in a nitrogen-atmosphere under vigorous stirring in a condensation-vessel, to 220° C. This temperature is maintained for 3–4 hours. Subsequently, a 3-hour after-condensation in vacuum is carried out. In this step the vacuum is slowly increased from 50 to 1 torr and the temperature from 220° to 240° C. After cooling of the melt there is obtained a water-clear, colorless polycondensate. It solidifies on cooling and can be used to provide shaped articles as is described above in Example 6.

Example 9

A solution of 128 g. sodium-hydroxide in 1.4 ltr. water, 2 mol 2,2-bis-(p-hydroxyl-phenyl)-propane, and 2.5 mol epichlorydrin are placed in a reaction vessel. Within 80 minutes the temperature is raised while stirring to 100° C., and the material is then refluxed for 1 hour at 100–104° C. Subsequently the aqueous layer is decanted and the resin washed with boiling water. 100 g. of the dried resin (epoxide-value; 0.116) are mixed with 10 g. 3-(aminomethyl) - 3,5,5 - trimethyl-1-cyclohexylamine, (whereupon, under rapid spontaneous heating, a tough infusible resin is formed). This resin is solid at ambient temperatures and can be used to provide shaped articles as is described above in Example 6.

Resinous condensation products of the products of the instant invention are described and claimed in application Ser. No. 243,182, filed Dec. 3, 1962, and assigned to the assignee hereof.

While the invention has been described with respect to particular embodiments thereof, it will be appreciated that these embodiments are merely representative and do not serve to set forth the limits of the invention.

What is claimed is:

1. Compound of the formula:

wherein each R is lower alkyl and X is selected from the group consisting of amino and hydroxy.

2. The compound:

3. The compound:

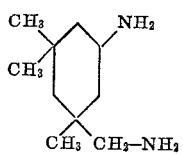

References Cited

UNITED STATES PATENTS

| | | | |
|---|---|---|---|
| 2,165,515 | 7/1939 | Schmidt | 260—563 X |
| 2,818,431 | 12/1957 | Beegle | 260—563 |
| 2,850,519 | 9/1958 | Krimm | 260—563 X |
| 2,862,030 | 11/1958 | Klein | 260—563 |
| 2,969,393 | 1/1961 | Joris | 260—563 |
| 2,971,021 | 2/1961 | Schipper | 260—464 |
| 2,975,189 | 3/1961 | Bortnick et al. | 260—464 |
| 2,993,068 | 7/1961 | Schipper | 260—563 X |
| 3,005,015 | 10/1961 | Melby | 260—464 |
| 3,012,994 | 12/1961 | Bell et al. | 260—563 X |
| 3,100,205 | 8/1963 | Schulte et al. | 260—563 X |

FOREIGN PATENTS 119,862   12/1899   Germany.

OTHER REFERENCES

Cosciug, C.A., vol. 38, p. 4575 (1944).

Mousseron et al., Compt. rend., vol. 226, pp. 91–92 (1948).

Tchoubar, Bull. Soc. Chim. France, volume of 1949, pp. 160–169.

Gripenberg, Acta Chem. Scand., vol. 6, pp. 854–858 (1952).

Houben-Weyl, "Methoden Der Organischen Chemie," vol. 11/1, p. 569 (1957).

CHARLES B. PARKER, *Primary Examiner.*

J. P. BRUST, F. D. HIGEL, *Assistant Examiners.*